United States Patent Office 3,077,454
Patented Feb. 12, 1963

3,077,454
COMPOSITIONS FOR INHIBITING CORROSION
Roger F. Monroe, Clare H. Kucera, Billy D. Oakes, and Nelson G. Johnston, all of Tulsa, Okla., assignors to The Dow Chemical Company, Midland, Mich., a corporation of Delaware
No Drawing. Filed July 14, 1960, Ser. No. 42,944
14 Claims. (Cl. 252—148)

The present invention relates to a new and useful class of corrosion inhibitors. More particularly the present invention concerns novel compositions of matter which materially reduce the attack of aqueous solutions of both strong and weak acids on metals of construction.

Various inhibitors for preventing the attack of acids on metals have been proposed. For example, in the exploration and recovery of oil from underground fields it is common to "acidize" both new and producing wells with aqueous solutions of strong acids. Of the many inhibitors especially designed to prevent acid attack of the well casings, very few provided satisfactory protection or were even accepted by the industry. The old standby arsenic and/or various arsenic compounds are still used even though numerous persons have died from arsenic poisoning and the refineries complain of catalyst poisoning. The toxic nature of the arsenic and the effect of the arsenic on the new and at times exotic catalysts used in modern refineries has resulted in the expenditure of hundreds of thousands of hours by research teams, to say nothing of the dollars to maintain the teams, in trying to produce an inhibitor system of sufficient merit to enable the cessation of the use of arsenic inhibitors. Of the newer inhibitors, the most promising were the acetylenic alcohols, however, the toxicity and cost of these compounds has held back their wide acceptance.

Even in the field of industrial cleaning there are few if any so-called universal inhibitors and most inhibitor systems are ineffective above about 250° F. Therefore, it would be desirable to find a more universal inhibitor which is at least as effective as the arsenic based or acetylenic inhibitors at temperatures from about 150° F. to about 350° F. and which inhibitor is relatively non-toxic.

It has now been found that by combining certain active hydrogen containing compounds with organic ketones having at least one hydrogen atom on the carbon atom alpha to the carbonyl group and an aldehyde selected from the group consisting of aliphatic aldehydes containing from 1 to 16 carbons, and aromatic aldehydes of the benzene series, having no functional groups other than aldehyde groups, and a fatty acid, there is obtained an inhibitor which will effectively prevent the attack on metal by aqueous acids. The inhibitor is capable of reducing, if not substantially preventing, metal attack by aqueous acids at temperatures as high as 350° F. Further, the inhibition compares favorably with that obtained when using the arsenic based or acetylenic based inhibitors at the low temperatures encountered in industrial chemical acid cleaning and is equal, if not superior, to arsenic at the temperatures encountered in oil-well acidizing, i.e., from about 200° to 350° F.

It is to be understood that in certain applications it may be desirable, if not advantageous, to include with the inhibtor above set forth a wetting agent such as an anionic, amphoteric, cationic or non-ionic wetting agent. Further, the well known class of acid inhibitors, the alkyne (acetylene) alcohols, when added to the inhibitor, generally increase to some extent inhibitor effectiveness and inhibitor life. The toxicity of the acetylenic alcohols is materially decreased when employed as the minor constituent of the present inhibitor.

In preparing the inhibitor to the present invention the active hydrogen compound containing at least one active hydrogen attached to a nitrogen atom per molecule is reacted with a ketone having at least one hydrogen atom attached to the carbon atom alpha to the carbonyl group, an aldehyde, and a fatty acid, preferably in the presence of an acid catalyst, at a temperature of from about 150° to about 250° F. or from 1 to about 16 hours. The crude reaction product is then mixed with an additional quantity of the fatty acid to bring the weight ratio of fatty acid to active hydrogen-aldehyde-ketone-HCl adduct to 0.6 to 24 parts of fatty acid per part of adduct. The resulting product comprises the essential ingredients of the inhibitor of the present invention.

A preferred embodiment for preparing the inhibitor of the present invention is to react (A) about 1 mole of active hydrogen compound and from 2 to 10 moles of aldehyde and from 1.5 to 10 moles of ketone, and 0 to 5 moles of acid catalyst if desired, with (B) from 0.6 to 24 and preferably from 1 to 3 parts by weight, based on the product of reaction of reactant (A), of a fatty acid at a temperature from about 65 to about 120° C. (150° F. to 250° F.) for from 1 to 16 hours. Upon completion of the reaction additional fatty acid may be added with stirring to bring the weight ratio of fatty acid to adduct to 0.6 to 24 parts by weight of acid per part of adduct. Thereafter, the wetting agent in an amount of from about one part per 1 to 10 parts of inhibitor, and the alkyne (acetylenic) alcohol in an amount of from one part per 6 to 19 parts of inhibitor can be added with stirring. The inhibitor is then ready to add to the aqueous acid, in an amount of from 0.05 percent by volume to about 2.0 percent by volume. More inhibitor may be added but no marked increase in corrosion inhibition or inhibitor life is observed when operating at normal temperatures (below about 200° F.). However, when operating above 200° F. it is often times advantageous to employ as much as two to six times the economical upper limit, that is from 4.0 to 12.0 percent by volume.

The active hydrogen compounds which can be employed in accordance with the present invention are those organic ammonia derivatives having at least one hydrogen atom attached to nitrogen, as for example, primary and secondary amines, diamines, amides, ureas, thioureas, ammonia and ammonium salts, alicyclic amines, heterocyclic amines, aromatic amines and the like which contain no group reactive under the conditions of the reaction other than hydrogen attached to nitrogen. Some of such compounds which have been found effective are the normal alkylamines having from 1 to 20 or more carbon atoms in the alkyl substituent, as for example, methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, nonaldecylamine, eicosylamine, and mixtures thereof. The isoalkyl and ter. alkylamines having up to 20 carbon atoms in the alkyl substituent such as for example, isopropylamine, isobutylamine, isoamylamine, and the like, ter. butylamine, ter. amylamine and the like; the dialkylamines having from 1 to 20 alkyl groups in the alkyl substituents such as dimethylamine, diethylamine, dipropylamine, dibutylamine, diamylamine, dihexylamine, diheptylamine, dioctylamine, didecylamine, dioctadecylamine and the like, as well as the diiso and tertiary alkylamines, and mixtures thereof. The diamines which are useful as the active hydrogen compound include those diamines having from 1 to 20 carbon atoms in the alkyl portions thereof such as menthylenediamine, ethylenediamine, propylenediamine, butylenediamine, diaminopentane (see pentylenediamine), diaminohexane (hexylenediamine) and the like. In addition other nitrogen containing compounds having an active hydrogen on the nitrogen atom such as ammonia, ureas, thioureas, amides, ammonium salts and alicyclic, heterocyclic and aromatic amines are operative as the active hydrogen compound in accordance with the present invention. Thus, one can employ ammonia, urea, thiourea, 1-acetyl-2-thiourea, N-allylthiourea, dithiobiuret, 1-phenyl-2-thiourea, 1,3-di(Rosin Amine D) thiourea, 1,3-dibutylthiourea and the like, acetamide, N-1-napthylacetamide, oxamide, acetamide, adipamide, propionamide, thioacetamide, malonamide, formamide, alpha-cyanoacetamide, succinamide, n-butyramide, acetamide, dimethylacetamide, N-methylacetamide, n-butyloxamate, hexanamide, phthalimide, n-valeramide, isobutyramide, Armid 12 (95 percent dodecanamide, 4 percent tetradecanamide, 1 percent decanamide), N,N'-dibenzyldithiooxamide, dithiooxamide, Armid C (amide of coco fatty acids), 1-napthaleneacetamide, Armid O (91 percent oleamide, 6 percent stearylamide, 3 percent linolamide), N,N'-dimethylthiooxamide, acetanilide, Armid HT (75 percent stearylamide, 22 percent palmitamide, 3 percent oleamide), nonanamide, N,N'-dicyclohexyldithiooxamide, benzamide, B-isothioureidopropionic acid, N,N'-bis(hydroxymethyl)-dithiooxamide, and the like, 2-methylpiperazine, morpholine, pyrrolidine, 2-aminoethylpiperazine, and the like, 2-naphthylamine, benzylamine, 2-aminopyradine, aniline and the like, 1,3-diphenyltriazine, and the like, ammonium chloride, monobasic ammonium phosphate, ammonium acetate, ammonium thiocyanate, ammonium oxalate, dibasic sodium ammonium phosphate and the like are effective sources of active hydrogen in accordance with the present invention.

The ketones which are operative in accordance with the present invention are those having at least one hydrogen atom on the carbon atom alpha to the carbonyl group. Some of such ketones found to be effective are the aliphatic and aryl substituted aliphatic ketones and mixtures thereof, as for example, acetophenone, 1-acetonaphthone, 1 part acetophenone+1 part acetone, p-methoxyacetophenone, propiophenone, p-chloroacetophenone, isophorone, tetrolophenone, 2,4-pentanedione, Ketosol (75 percent phenethyl alcohol, 25 percent acetophenone), 2-acetylcyclohexanone, 2-acetonaphthone, 2-thienylketone, methyl isobutylketone, n-butyrophenone, acetone, 3,4-dihydro-1-(2H)-naphthalenone, 2-heptanone, diacetone alcohol, undecanone-2, and the like.

The class of fatty acids found to be operative include the alkyl carboxylic acids having from 1 to 20 carbon atoms, the olefinic carboxylic acids having from 2 to 20 carbon atoms and having from 1 to 2 or more unsaturated sites along the chain. In addition the various alkylene oxide adducts of the above acids have been found effective. Thus one can employ rendered animal fat, octanoic acid, myristic acid, pelargonic acid, abietic acid, acetic acid, lauric acid, formic acid, oleic acid, capri acid, tall oil acid, coco fatty acids+15 moles ethylene oxide, oleic acid+15 moles ethylene oxide, 70 percent rosin fatty acids+15 moles ethylene oxide, tall oil+4 moles propylene oxide+8 moles ethylene oxide, tall oil+6 moles propylene oxide+12 moles ethylene oxide, tall oil+8 moles propylene oxide+8 moles ethylene oxide, tall oil+4 moles propylene oxide+12 moles ethylene oxide, tall oil+4 moles propylene oxide+10 moles ethylene oxide, tall oil+6 moles propylene oxide+8 moles ethylene oxide, tall oil+6 moles propylene oxide+10 moles ethylene oxide, and the like.

The class of aldehydes which are operative in accordance with the present invention include the aldehydes having from 1 to 16 or more carbon atoms. Thus one can employ formaldehyde, urotropine, benzaldehyde, hexanal, octanal, decanal, hexadecanal, and the like.

Wetting agents which can be employed in some instances with the inhibitor are those selected from the classes known as anionic, nonionic, cationic and amphoteric. Some of such wetting agents are the mono and dialkyl phenols condensed with 10 to 50 moles of ethylene oxide such as the nonylphenols condensed with from 10 to 50 moles of ethylene oxide, disecondary butyl phenol condensed with from 5 to 30 moles of ethylene oxide, and the like, the polyethylene glycol alkyl mercaptans such as polyethylene glycol tertiary dodecyl mercaptan, ammonium isopropylbenzeneparasulfonate, diethanolamide of coconut oil, the difatty alkyl quaternary ammonium chlorides of mixed fatty alkyls such as octyl, decyl, dodecyl, tetradecyl, hexadecyl and octadecyl, and the like.

The alkynyl (acetylenic) alcohols which can be employed with the inhibitor of the present invention are those acetylenic alcohols having from 3 to 10 carbon atoms such as 1-propyn-3-ol, 1-butyn-3-ol, 1-pentyn-3-ol, 1-heptyn-3-ol, 1-octyn-3-ol, 1-nonyl-3-ol, 1-decyn-3-ol, and the like. The following alkynols are useful at temperatures below about 150° F. 1-ethynylcyclohexanol, methylbutynol, methylpentynol, butynediol and the like.

The inhibitor of the present invention substantially eliminates the attack of oxidizing and non-oxidizing acids on industrial metals. Thus, one can employ the inhibitor with such diverse acids as the strong or weak organic acids, such as acetic, propionic, formic, and the like, as well as the mineral acids such as hydrochloric, sulfuric, phosphoric, sulfonic, sulfamic, and the like.

The acid catalyst which can be employed in preparing the inhibitor are the mineral acids such as sulfuric, hydrochloric, phosphoric, and the strong organic acids such as formic, acetic, propionic acids, and the like.

The following examples are illustrative of the present invention but are not to be construed as limiting.

EXAMPLE 1

The following composition was charged to a 72 liter glass reaction flask equipped with a stirrer and reflux condenser:

|  | Lbs. |
|---|---|
| Thiourea | 6.4 |
| Acetophenone | 20.0 |
| 37.0 percent hydrochloric acid | 12.0 |
| Formalin | 31.0 |
| Refined tall oil fatty acid [1] | 48.0 |

[1] Refined tall oil fatty acid: 7.6 percent rosin acids, 45 percent oleic acid, 45 percent linoleic acid and 2.4 percent unsaponified material.

The materials were added in the order listed, however, they may be added in any convenient order. The charge is refluxed gently for 16 hours while stirring. The product was allowed to stand for 2 to 3 hours during which time the temperature dropped from 212° F. to about 100° F. and an aqueous layer separated to the bottom of the flask. The aqueous layer of approximately 37.4 lbs. was pumped off and discarded. The crude concentrate, the organic layer, weighing 80 pounds was pumped into a tared polyethylene lined drum and 96 pounds of tall oil (1.2 times the weight of crude concentrate) was added to bring the ratio of tall oil to thiourea-acetophenone-formaldehyde adduct formed above to about 4.5:1. The inhibitor thus formed was further formulated by adding with stirring 24.7 pounds of a wetting agent (nonyl phenol condensed with 15 moles ethylene oxide), and 22.2 pounds propargyl alcohol.

The inhibitor described above was used in an acidizing treatment on a well having a bottom hole temperature of about 240° F.

Thirteen thousand gallons of inhibited 15 percent hydrochloric acid was prepared by adding 104 gallons of the above inhibitor to 12,857 gallons 15 percent hydrochloric acid. The so prepared acid was used in an acidizing operation of a new well carried out according to normal acidizing procedures.

The treatment of the well was accomplished without formation of an emulsion with the formation oil and without breakdown of the inhibitor during the 1 hour and a half acidizing operation.

EXAMPLE 2

0.5 mole (37 grams) n-butylamine, 2.2 moles (165 ml., 177 grams) aqueous 37 percent formalin, 1 mole (120 grams) acetophenone, 0.7 mole (60 ml., 70.8 grams) 37 percent hydrochloric acid and 374 grams of tall oil acid (2 parts by weight based on the theoretical chemical adduct of the aforestated reactants) were charged into a reactor and stirred under gentle reflux (90 to 95° C.) for 16 hours. The n-butylamine, formalin, acetophenone, hydrochloric acid and tall oil solution was cooled to room temperature (about 1 hour) and the aqueous layer which formed at the bottom was separated and discarded. The upper organic layer, 575 grams (hereinafter called product B), is ready for use directly or in suitable formulations with a wetting agent and an alkyne alcohol. To the 575 grams of product B is added 192 grams nonyl phenol condensed with 15 moles ethylene oxide and 85.2 grams propargyl alcohol to form an inhibitor which is used in certain of the examples hereinafter.

GENERAL CORROSION RATE DETERMINATION PROCEDURE

The corrosion rate determinations of the following examples were made as follows: a quarter segment of a one inch wide ring was cut from API N80 oil field tubing having an outside diameter of 2.375 inches, an inside diameter of 2 inches and a surface area of 4.34 in.$^2$. The weighed metal coupon was placed in 100 ml. 15 percent hydrochloric acid containing the inhibitor which had been preheated 200° F. and exposed for 16 hours. At the end of this time, the coupon was reweighed and the corrosion rate calculated from the weight lost. All rates given are based on duplicate determinations. This same procedure was followed throughout this work except for the variations indicated in each table.

In order to compare an uninhibited acid with the inhibited acids the General Corrosion Rate Determination Procedure was run as outlined above but no inhibitor was mixed with the acid. Under severe test conditions uninhibited acid so rapidly attacked the metal coupon that the acid was expended before the test was complete. Therefore, a one-half hour test time was employed. In one-half hour the acid strength was found to be about the same as that after a 16 hour test with the various inhibitors. The corrosion rate of uninhibited acid was found to be 5.3 pounds per square foot per day.

EXAMPLES 3–16

Tests were made to determine the concentration of inhibitor necessary at various temperatures. In these tests, an inhibitor having the following composition: 4.8 pounds thiourea, 15 pounds acetophenone, 9 pounds 37 percent hydrochloric acid, 23 pounds aqueous 37 percent formaldehyde, 231 pounds crude tall oil, 83 pounds nonyl phenol condensed with 15 moles ethylene oxide and 37.2 pounds propargyl alcohol. Test data below shows that at 125° F., a concentration of as low as 0.05 percent (by volume) gives good control of corrosion. Use of more than about 0.2 percent inhibitor has no particular advantage at this temperature. At 200° F., a concentration of at least 0.4 percent is recommended. 0.8 percent or more does not appreciably improve the inhibitor although there is no harm in using larger amounts.

TABLE I

*Test Conditions: See General Corrosion Rate Determination Procedure*

| Ex. | Conc. inhibitor (% by vol.) | Temperature of test (°F.) | Length of test (hrs.) | Corrosion rate (lbs./ft.$^2$/day) |
|---|---|---|---|---|
| 3 | 0.025 | 125 | 24 | >1.0 |
| 4 | 0.05 | 125 | 24 | 0.13 |
| 5 | 0.1 | 125 | 24 | 0.007 |
| 6 | 0.15 | 125 | 24 | 0.007 |
| 7 | 0.2 | 125 | 24 | 0.0035 |
| 8 | 0.3 | 125 | 24 | 0.003 |
| 9 | 0.3 | 200 | 16 | >1.0 |
| 10 | 0.4 | 200 | 16 | 0.64 |
| 11 | 0.5 | 200 | 16 | 0.36 |
| 12 | 0.6 | 200 | 16 | 0.043 |
| 13 | 0.7 | 200 | 16 | 0.015 |
| 14 | 0.8 | 200 | 16 | 0.015 |
| 15 | 1.0 | 200 | 16 | 0.012 |
| 16 | 1.0 | 275 | 2.5 | 0.26 |

EXAMPLES 17–29

The following examples conducted using the inhibitor of Example 3 but varying the ratio of tall oil acid to thiourea adduct illustrate the broad range of equivalents possible when employing the inhibitors of the present invention.

TABLE II

*Test Conditions: See General Corrosion Rate Determination Procedure*

[Concentration inhibitor—0.6% (by vol.)]

| Example | Wt. ratio—Tall oil acid to thiourea adduct | Corrosion rate (lbs./ft.$^2$/day) |
|---|---|---|
| 17 | 0.5:1 | 0.17 |
| 18 | 1.5:1 | 0.020 |
| 19 | 2:1 | 0.025 |
| 20 | 2.5:1 | 0.014 |
| 21 | 3:1 | 0.014 |
| 22 | 4:1 | 0.015 |
| 23 | 5:1 | 0.02 |
| 24 | 6:1 | 0.02 |
| 25 | 7:1 | 0.03 |
| 26 | 8:1 | 0.05 |
| 27 | 10:1 | 0.06 |
| 28 | 12:1 | 0.03 |
| 29 | 13:1 | 0.05 |
| 30 | 14:1 | 0.025 |
| 31 | 15:1 | 0.025 |
| 32 | 16:1 | 0.067 |
| 33 | 17:1 | 0.50 |
| 34 | 18:1 | 0.12 |
| 35 | 22:1 | 0.27 |
| 36 | 30:1 | 0.17 |
| 37 | 35:1 | 0.72 |
| 38 | 40:1 | >1.0 |

EXAMPLES 39–130

TABLE III

The following tests were made to show the scope of active hydrogen compounds which are operative in accordance with the present invention.

The inhibitor was identical to that prepared in Example 2 except various active hydrogen compounds were substituted for the n-butylamine.

PRIMARY, SECONDARY AND ALICYCLIC AMINES

[Concentration inhibitor—0.6% (by vol.)]

| Ex. | Active hydrogen compound | Wt. ratio, fatty acid to adduct | Corrosion rate (lbs./ft.²/day) |
|---|---|---|---|
| 39 | None | | >1.0 |
| 40 | Hydroxylamine | 2.6:1 | 0.020 |
| 41 | n-Hexylamine | 2:1 | 0.021 |
| 42 | n-Butylamine | 2:1 | 0.021 |
| 43 | Dimethylamine | 2:1 | 0.032 |
| 44 | n-Propylamine | 2:1 | 0.033 |
| 45 | Armeen 8D (90% octyl, 7% decyl, 3% hexyl) | 2:1 | 0.046 |
| 46 | Amine 9D 178 [1] | 2.6:1 | 0.2 |
| 47 | 2-methyl-3-amino-butane-2-ol | 2:1 | 0.23 |
| 48 | Cyclohexylamine | 2.6:1 | 0.26 |
| 49 | Armeen 16D (92% hexadecyl, 7% octadecyl, 1% octadienyl) | 2:1 | 0.30 |
| 50 | 3-aminopropanol | 2:1 | 0.33 |
| 51 | Armeen 13D (90% octadecyl, 6% hexadecyl, 4% octadienyl) | 2:1 | 0.40 |
| 52 | Diethylamine | 2:1 | 0.64 |
| 53 | Oleylamine | 2:1 | 0.70 |

DIAMINES

| Ex. | Active hydrogen compound | Wt. ratio | Corrosion rate |
|---|---|---|---|
| 54 | 1,8-menthanediamine | 2.6:1 | 0.019 |
| 55 | 1,2-propanediamine | 2:1 | 0.020 |
| 56 | 1,4-diaminobutane | 2:1 | 0.021 |
| 57 | N,N'-dimethyl-1,3-propanediamine | 2:1 | 0.024 |
| 58 | 1,6-hexandiamine | 2:1 | 0.031 |
| 59 | 1,4-bis(aminomethyl)-cyclohexane | 2:1 | 0.039 |
| 60 | 1,2-diaminoethane | 2.6:1 | 0.040 |
| 61 | N-1-napthylethylenediamine | 2:1 | 0.047 |
| 62 | Diamine D (3-amino-n-propyl rosin amine) | 2.6:1 | 0.070 |
| 63 | 1,3-diaminopropane | 2:1 | 0.20 |
| 64 | 1,10-diaminodecane | 2:1 | 0.23 |
| 65 | Alkanolamine still bottoms | 2:1 | 0.34 |
| 66 | 1,7-diaminoheptane | 2:1 | 0.48 |

HETEROCYCLIC AMINES

| Ex. | Active hydrogen compound | Wt. ratio | Corrosion rate |
|---|---|---|---|
| 67 | 2-methylpiperazine | 2:1 | 0.018 |
| 68 | Morpholine | 2.6:1 | 0.025 |
| 69 | Pyrrolidine | 2:1 | 0.033 |
| 70 | N-2-aminoethylpiperazine | 2:1 | 0.034 |
| 71 | Piperidine | 2:1 | 0.41 |

AROMATIC AMINES

| Ex. | Active hydrogen compound | Wt. ratio | Corrosion rate |
|---|---|---|---|
| 72 | 2-napthylamine | 2:1 | 0.026 |
| 73 | Benzylamine | 2:1 | 0.051 |
| 74 | 2-aminopyridine | 2.6:1 | 0.20 |
| 75 | Aniline | 2:1 | 0.40 |

UREAS AND THIOUREAS

| Ex. | Active hydrogen compound | Wt. ratio | Corrosion rate |
|---|---|---|---|
| 76 | 1-acetyl-2-thiourea | 2:1 | 0.016 |
| 77 | N-allylthiourea | 2:1 | 0.020 |
| 78 | Dithiobiuret | 2:1 | 0.020 |
| 79 | Thiourea | 2:1 | 0.025 |
| 80 | 1-phenyl-2-thiourea | 2:1 | 0.027 |
| 81 | 1,3-di "RAD" thiourea | 2:1 | 0.070 |
| 82 | Urea | 2:1 | 0.08 |
| 83 | Ethylene thiourea | 2:1 | 0.11 |
| 84 | 1,3-dibutyl thiourea | 2:1 | 0.40 |

AMIDES

| Ex. | Active hydrogen compound | Wt. ratio | Corrosion rate |
|---|---|---|---|
| 85 | Acetamide | 2:1 | 0.013 |
| 86 | n-1-napthylacetamide | 2:1 | 0.014 |
| 87 | Oxamide | 2:1 | 0.016 |
| 88 | Acetamide | 2:1 | 0.017 |
| 89 | Adipamide | 2:1 | 0.017 |
| 90 | Propionamide | 2:1 | 0.017 |
| 91 | Thioacetamide | 2:1 | 0.017 |
| 92 | Malonamide | 2:1 | 0.019 |
| 93 | Formamide | 2:1 | 0.019 |
| 94 | Alpha-cyanoacetamide | 2:1 | 0.020 |
| 95 | Succinamide | 2:1 | 0.021 |
| 96 | n-Butyramide | 2:1 | 0.025 |
| 97 | Acetamide | 2:1 | 0.025 |
| 98 | N-methylacetamide | 2:1 | 0.037 |
| 99 | n-Butyloxamate | 2:1 | 0.039 |
| 100 | Hexanamide | 2:1 | 0.040 |
| 101 | Phthalimide | 2.5:1 | 0.040 |
| 102 | n-Valeramide | 2:1 | 0.040 |
| 103 | Isobutyramide | 2:1 | 0.042 |
| 104 | Armid 12 (95% dodecanamide, 4% tetradeconamide, 1% decanamide) | 2:1 | 0.045 |
| 105 | N,N'-dibenzyldithiooxamide | 2:1 | 0.055 |
| 106 | Dithiooxamide | 2:1 | 0.056 |
| 107 | Armid C (amide of coco fatty acids) | 2:1 | 0.060 |
| 108 | 1-napthaleneacetamide | 2:1 | 0.061 |

| Ex. | Active hydrogen compound | Wt. ratio, fatty acid to adduct | Corrosion rate (lbs./ft.²/day) |
|---|---|---|---|
| 108a | Armid O (91% oleamide, 6% stearylamide, 3% linoleamide) | 2:1 | 0.062 |
| 109 | N,N'-dimethyldithiooxamide | 2:1 | 0.069 |
| 110 | Acetanilide | 2:1 | 0.074 |
| 111 | Armid HT (75% stearylamide, 22% palmitamide, 3% oleamide) | 2:1 | 0.080 |
| 112 | Nonanamide | 2:1 | 0.080 |
| 113 | Acetamide | 8:1 | 0.090 |
| 114 | N,N'-dicyclohexyldithiooxamide | 2:1 | 0.14 |
| 115 | Benzamide | 2:1 | 0.26 |
| 116 | B-isothioureidopropionic acid | 2:1 | 0.29 |
| 117 | N,N'-bis(hydroxymethyl)dithiooxamide | 2:1 | 0.40 |

AMMONIUM SALTS

| Ex. | Active hydrogen compound | Wt. ratio | Corrosion rate |
|---|---|---|---|
| 118 | Ammonium chloride | 2:1 | 0.014 |
| 119 | Ammonium phosphate, monobasic | 2:1 | 0.014 |
| 120 | Ammonium acetate | 2:1 | 0.015 |
| 121 | Ammonium thiocyanate | 2:1 | 0.018 |
| 122 | Ammonium oxalate | 2:1 | 0.048 |
| 123 | Sodium ammonium phosphate, dibasic | 2:1 | 0.072 |

MISCELLANEOUS

| Ex. | Active hydrogen compound | Wt. ratio | Corrosion rate |
|---|---|---|---|
| 124 | Gamma-aminopropyltriethoxysilane | 2:1 | 0.019 |
| 125 | Gamma-aminobutylmethyldiethoxysilane | 2:1 | 0.020 |
| 126 | N,N'-dicarbethoxyhydrazine | 2:1 | 0.025 |
| 127 | Benzidine | 2:1 | 0.030 |
| 128 | Dicyandiamide | 2:1 | 0.049 |
| 129 | Guanidine | 2.6:1 | 0.30 |
| 130 | Allyl-isothiouronium hydrochloride | 6:1 | 0.45 |

[1] Amine 9D 178 is
$(CH_3)_3CCH_2C(CH_3)_2CH_2CH=CHCH_2NHC(R,R',R'')$
where $R+R'+R''=11$ to 14 carbon atoms.

EXAMPLES 131–154

A series of experiments were made using an inhibitor prepared in the manner of Example 3 but substituting Rosin Amine D or thiourea for n-butylamine in certain instances and using various fatty acids in place of tall oil acid to show the scope of saturated and unsaturated acids containing from 1 to 20 carbon atoms which are operable in accordance with the present invention.

TABLE IV

*Test Conditions: See General Corrosion Rate Determination Procedure*

| Ex. | Fatty acid | Active hydrogen compound | Weight ratio, fatty acid to adduct | Corrosion rate (lbs./ft.²/day) |
|---|---|---|---|---|
| 131 | None | Rosin Amine D | | 0.34 |
| 132 | Tall oil acid | do | 2:1 | 0.017 |
| 133 | Rendered animal fat | do | 2.6:1 | 0.020 |
| 134 | Octanoic acid | do | 2:1 | 0.035 |
| 135 | Myristic acid | do | 2.6:1 | 0.050 |
| 136 | Pelargonic acid | do | 2.6:1 | 0.061 |
| 137 | Abietic acid | do | 2.6:1 | 0.20 |
| 138 | do | do | 10:1 | 0.22 |
| 139 | Acetic acid | do | 2:1 | 0.22 |
| 140 | Lauric acid | do | 2.6:1 | 0.51 |
| 141 | Formic acid | do | 2:1 | 0.59 |
| 142 | Oleic acid | do | 2.6:1 | 0.90 |
| 143 | Capric acid | do | 2.6:1 | >1.0 |
| 144 | Tall oil acid | Thiourea | 4.5:1 | 0.030 |
| 145 | Coco fatty acids plus 15 moles ethylene oxide | do | 6:1 | 0.035 |
| 146 | Oleic acid plus 15 moles ethylene oxide | do | 6:1 | 0.14 |
| 147 | 70% rosin fatty acids plus 15 moles ethylene oxide | do | 6:1 | 0.95 |
| 148 | Tall oil acid plus 4 moles propylene oxide plus 8 moles ethylene oxide | do | 6:1 | 0.2 |
| 149 | Tall oil acid plus 6 moles propylene oxide plus 12 moles ethylene oxide | do | 6:1 | 0.4 |
| 150 | Tall oil acid plus 8 moles propylene oxide plus 8 moles ethylene oxide | do | 6:1 | 0.5 |

See footnote at end of table.

TABLE IV—Continued

| Ex. | Fatty acid | Active hydrogen compound | Weight ratio, fatty acid to adduct | Corrosion rate (lbs./ ft.²/day) |
|---|---|---|---|---|
| 151 | Tall oil acid plus 4 moles propylene oxide plus 12 moles ethylene oxide. | do | 6:1 | 0.3 |
| 152 | Tall oil acid plus 4 moles propylene oxide plus 10 moles ethylene oxide. | do | 6:1 | >1.0 |
| 153 | Tall oil acid plus 6 moles propylene oxide plus 8 moles ethylene oxide. | do | 6:1 | 0.4 |
| 154 | Tall oil acid plus 6 moles propylene oxide plus 10 moles ethylene oxide. | do | 6:1 | 0.8 |

NOTE.—Rosin Amine D is a technical grade of dehydroabietyl amine

EXAMPLES 155-160

The following tests were made to show the effectiveness of the inhibitor and the scope of aldehydes which are useful. The inhibitor was prepared using the procedure of Example 2 but employing Rosin Amine D for the n-butylamine and various aldehydes in place of formaldehyde.

TABLE V

*Test Conditions: See General Corrosion Rate Determination Procedure*

[Concentration inhibitor—0.6% (by volume)]

| Ex. | Aldehydes | Weight ratio, fatty acid to adduct | Corrosion rate (lbs./ ft.²/day) |
|---|---|---|---|
| 155 | None | 2:1 | >1.0 |
| 156 | Formaldehyde | 2:1 | 0.017 |
| 157 | Urotropine | 2:1 | 0.04 |
| 158 | Benzaldehyde | 2:1 | 0.093 |
| 159 | Isovaleraldehyde | 2:1 | 0.13 |
| 160 | Hexanal | 2:1 | 0.17 |

EXAMPLES 166-181

Tests were made to show the scope of the ketones useful in accordance with the present invention. The inhibitor was the same as that used in Examples 120-125 except that various ketones were substituted for the acetophenone.

TABLE VI

*Test Conditions: See General Corrosion Rate Determination Procedure*

[Concentration inhibitor—0.6% (by volume)]

| Ex. | Ketone | Weight ratio, fatty acid to adduct | Corrosion rate (lbs./ ft.²/day) |
|---|---|---|---|
| 161 | None | 2:1 | >1.0 |
| 162 | Acetophenone | 2:1 | 0.017 |
| 163 | 1-acetonaphthone | 2:1 | 0.024 |
| 164 | 1 part acetophenone plus 1 part acetone | 2.5:1 | 0.030 |
| 165 | p-Methoxyacetophenone | 2.6:1 | 0.030 |
| 166 | Propiophenone | 2:1 | 0.050 |
| 167 | p-Chloroacetophenone | 2:1 | 0.051 |
| 168 | Isophorone | 2:1 | 0.056 |
| 169 | Tetralophenone | 2.6:1 | 0.075 |
| 170 | 2,4-pentanedione | 2:1 | 0.080 |
| 171 | Ketosol (75% phenethyl alcohol, 25% acetophenone). | 2:1 | 0.080 |
| 172 | 2-acetylcyclohexanone | 2:1 | 0.095 |
| 173 | 2-acetonaphthone | 2:1 | 0.12 |
| 174 | 2-thienylketone | 2.6:1 | 0.15 |
| 175 | Methyl isobutyl ketone | 2.6:1 | 0.20 |
| 176 | n Butyrophenone | 2:1 | 0.21 |
| 177 | Acetone | 2:1 | 0.25 |
| 178 | 3,4-dihydro-1-(2H)-naphthalenone | 2.6:1 | 0.30 |
| 179 | 2-heptanone | 2:1 | 0.30 |
| 180 | Diacetone alcohol | 2:1 | 0.45 |
| 181 | Undecanone-2 | 2:1 | 0.76 |

EXAMPLES 182-191

The following tests were run to show the effect of various acid catalysts in the inhibitor formulation. The inhibitor was prepared in the manner of Example 3 substituting in certain instances Rosin D Amine and using various acid catlaysts.

TABLE VII

*Test Conditions: See General Corrosion Rate Determination Procedure*

[Concentration inhibitor—0.6% (by volume)]

| Ex. | Acid catalyst | Active hydrogen compound | Weight ratio, fatty acid to adduct | Corrosion rate (lbs./ ft.²/day) |
|---|---|---|---|---|
| 182 | None | Rosin Amine D | 2.6:1 | 0.02 |
| 183 | do | do | 3:1 | 0.20 |
| 184 | Acetic acid | do | 2.6:1 | 0.02 |
| 185 | Hydrochloric acid | do | 2.6:1 | 0.03 |
| 186 | Phosphoric acid | do | 2.6:1 | 0.03 |
| 187 | Sulfuric acid | do | 2.6:1 | 0.08 |
| 188 | None | Thiourea | 4.5:1 | 0.25 |
| 189 | Hydrochloric acid | do | 2.5:1 | 0.014 |
| 190 | Sulfuric acid | do | 4.5:1 | 0.02 |
| 191 | Acetic acid | do | 4.5:1 | 0.3 |

EXAMPLES 192-198

To show the effect of various wetting agents on the inhibitor formulation the following tests were run using the procedure of Example 2 but substituting Rosin Amine D for thiourea and using various wetting agents.

TABLE VIII

*Test Conditions: See General Corrosion Rate Determination Procedure*

[Concentration inhibitor—0.6% (by volume)]

| Ex. | Wetting agent | Ionic type | Corrosion rate (lbs./ ft.²/day) |
|---|---|---|---|
| 192 | Nonyl phenol condensed with 15 moles ethylene oxide. | Nonionic | 0.029 |
| 193 | Nonic 234, polyethylene glycol tertiary dodecyl mercaptan. | do | 0.045 |
| 194 | Ammonium isopropylbenzene-para-sulfonate. | Anionic | 0.073 |
| 195 | Perfluorooctanoic acid | do | 0.030 |
| 196 | Diethanol amide of coconut oil | Nonionic | 0.090 |
| 197 | Nonyl phenol condensed with 30 moles ethylene oxide. | do | 0.12 |
| 198 | Di-sec-butylphenol condensed with 10 moles ethylene oxide. | do | 0.12 |

EXAMPLES 199-214

Tests were run which showed that the inhibitor of this invention will offer protection to the metals commonly encountered in well treating or industrial cleaning.

TABLE IX

Acid solution—150 ml. 5% hydrochloric acid.
Temperature of test—150° F.
Length of test—6 hours.
Inhibitor concentration—0.4% inhibitor (by volume) of Example 1.

| Ex. | Metal | Inhibitor | Corrosion rate (lbs./ ft.²/day) |
|---|---|---|---|
| 199 | Cast iron | None | >1.0 |
| 200 | do | Present | 0.078 |
| 201 | ASTM, SA83A | None | >1.0 |
| 202 | ASTM, SA83A | Present | 0.0027 |
| 203 | SS316 | None | 0.051 |
| 204 | SS316 | Present | 0.0019 |
| 205 | Yellow brass | None | 0.0020 |
| 206 | do | Present | 0.0014 |
| 207 | Copper | None | 0.0027 |
| 208 | do | Present | 0.00072 |
| 209 | Arsenical admiralty | None | 0.0019 |
| 210 | do | Present | 0.00078 |
| 211 | AISI 1010 | None | >1.0 |
| 212 | AISI 1010 | Present | 0.0028 |
| 213 | Aluminum 2024 T3 | None (80° F.) | 0.076 |
| 214 | do | Present (80° F.) | 0.0026 |

EXAMPLES 215-222

In addition to hydrochloric acid, the inhibitor was found to function in other mineral acids and lower organic acids.

TABLE X

Metal coupon—AISI 1010.
Acid solution—150 ml.
Length of test—6 hours.
Inhibitor concentration—0.4% inhibitor (by volume) of Example 1.

| Ex. | Acid | Inhibitor | Temperature of test (° F.) | Corrosion rate (lbs./ft.²/day) |
|---|---|---|---|---|
| 215 | 5% phosphoric | None | 150 | 0.16 |
| 216 | do | Present | 150 | 0.089 |
| 217 | 5% sulfuric | None | 150 | 0.36 |
| 218 | do | Present | 150 | 0.065 |
| 219 | 5% sulfamic | None | 150 | 0.22 |
| 220 | do | Present | 150 | 0.053 |
| 221 | 5% acetic | None | 150 | 0.0089 |
| 222 | do | Present | 150 | 0.0019 |

EXAMPLES 223-226

An inhibitor prepared in the manner of Example 2 except Rosin Amine D was substituted for n-butylamine and wherein wetting agent, propargyl alcohol and/or acid catalyst were left out, was tested in the manner of the General Corrosion Rate Determination Procedure and the following results were observed.

TABLE XI

[Inhibitor concentration—0.8% (by volume)]

| Ex. | Propargyl alcohol | Wetting agent | Acid catalyst | Weight ratio, tall oil acid to adduct | Corrosion rate (lbs./ft.²/day) |
|---|---|---|---|---|---|
| 223 |  | X | X | 2:1 | 0.029 |
| 224 | X |  | X | 2:1 | 0.02 |
| 225 |  |  | X | 2:1 | 0.87 |
| 226 |  |  |  | 2:1 | 1.19 |

The operable mole ratios of the components of the inhibitor composition of this invention are as follows: 1 mole active hydrogen compound; 2 to 10 moles aldehyde; 1.5 to 10 moles ketone; 0 to 5 moles acid catalyst and 0.6 to 24 parts by weight fatty acid based on the aforementioned ingredients. The upper limit of the ketone constituent is not critical, but an excess is of no particular value. The same can be said for the acid catalyst. Here, the catalyst is separated off as part of the discarded aqueous layer anyway.

We claim:

1. A corrosion inhibitor comprising the product of the reaction of (1) one mole of an ammonia derivative having at least one hydrogen attached to nitrogen and having no groups reactive under the conditions of reaction other than hydrogen, (2) from 1.5 to 10 moles of a ketone having at least one hydrogen atom on the carbon atom adjacent to the carbonyl group, (3) from 2 to 10 moles of an aldehyde selected from the group consisting of aliphatic aldehydes having from 1 to 16 carbon atoms and aromatic aldehydes of the benzene series and having no functional groups other than aldehyde groups, and (4) from 0.6 to 24 parts by weight based on (1), (2), and (3) of a fatty acid having from 1 to 20 carbon atoms at a temperature of from about 150° F. to about 250° F. for from about 1 to 16 hours.

2. A corrosion inhibited acid comprising an aqueous solution of an acid and an effective amount to inhibit metal corrosion of the corrosion inhibitor of claim 1.

3. A corrosion inhibitor comprising the product of the reaction of (1) one mole of an ammonia derivative having at least one hydrogen attached to nitrogen and having no groups reactive under the conditions of reaction other than hydrogen, (2) from 1.5 to 10 moles of a ketone having at least one hydrogen atom on the carbon adjacent to the carbonyl group, (3) from 2 to 10 moles of an aldehyde selected from the group consisting of aliphatic aldehydes having from 1 to 16 carbon atoms and aromatic aldehydes of the benzene series and having no functional groups other than aldehyde groups, (4) from 0 to 5 moles of acid catalyst, and (5) from 0.6 to 24 parts by weight based on (1), (2), (3), and (4) of a fatty acid having from 1 to 20 carbon atoms at a temperature of from about 150° F. to 250° F. for from about 1 to 16 hours.

4. A corrosion inhibited acid comprising an aqueous solution of an acid and an effective amount to inhibit metal corrosion of the corrosion inhibitor of claim 3.

5. A corrosion inhibitor consisting essentially of the reaction product of claim 3 and from about 10 to about 50 percent by weight based on the total composition of a wetting agent.

6. A corrosion inhibitor consisting essentially of 1 part by weight of an acetylenic alcohol having from 3 to 20 carbon atoms per 6 to 19 parts by weight of the composition of claim 5.

7. A corrosion inhibited acid comprising an aqueous solution of an acid and an effective amount to inhibit metal corrosion of the corrosion inhibitor of claim 5.

8. A corrosion inhibited acid comprising an aqueous solution of an acid and an effective amount to inhibit metal corrosion of the corrosion inhibitor of claim 6.

9. A process for preventing the corrosion of metal in contact with an aqueous acid solution which comprises contacting the metal surfaces with an aqueous acid solution containing an effective amount to inhibit metal corrosion of the corrosion inhibitor of claim 1.

10. A process for preventing the corrosion of metal in contact with an aqueous acid solution which comprises contacting the metal surfaces with an aqueous acid solution containing an effective amount to inhibit metal corrosion of the corrosion inhibitor of claim 3.

11. A process for preventing the corrosion of metal in contact with an aqueous acid solution which comprises contacting the metal surfaces with an aqueous acid solution containing an effective amount to inhibit metal corrosion of the corrosion inhibitor of claim 5.

12. A process for preventing the corrosion of metal in contact with an aqueous acid solution which comprises contacting the metal surfaces with an aqueous acid solution containing an effective amount to inhibit metal corrosion of the corrosion inhibitor of claim 6.

13. A process for preparing a corrosion inhibitor comprising reacting (1) one mole of an ammonia derivative having at least one hydrogen attached to nitrogen and having no groups reactive under the conditions of reaction other than hydrogen, (2) from 1.5 to 10 moles of a ketone having at least one hydrogen atom on the carbon atom adjacent to the carbonyl group, (3) from 2 to 10 moles of an aldehyde selected from the group consisting of aliphatic aldehydes having from 1 to 16 carbon atoms and aromatic aldehydes of the benzene series and having no functional groups other than aldehyde groups, and (4) from 0.6 to 24 parts by weight based on (1), (2) and (3) of a fatty acid having from 1 to 20 carbon atoms at a temperature of from 150° F. to about 250° F. for from about 1 to 16 hours.

14. The process of claim 13 wherein the reaction is carried out in the presence of from 0 to 5 moles of acid catalyst.

References Cited in the file of this patent

UNITED STATES PATENTS

| 2,758,970 | Saukaitis et al. | Aug. 14, 1956 |
| 2,913,408 | Pumpelly et al. | Nov. 17, 1959 |

FOREIGN PATENTS

| 525,860 | Canada | June 5, 1956 |